United States Patent [19]

Jakob

[11] 4,283,618
[45] Aug. 11, 1981

[54] WELDING APPARATUS WITH STEPPING CIRCUIT CURRENT CONTROL

[75] Inventor: Franz Jakob, Unterhaching, Fed. Rep. of Germany

[73] Assignee: Holger Reeh, Unterpfaffenhofen, Fed. Rep. of Germany

[21] Appl. No.: 943,877

[22] Filed: Sep. 19, 1978

[30] Foreign Application Priority Data

Sep. 20, 1977 [DE] Fed. Rep. of Germany ....... 2742341

[51] Int. Cl.³ .............................................. B23K 9/10
[52] U.S. Cl. .................................. 219/130.5; 219/132
[58] Field of Search ................. 219/130.5, 130.21, 132

[56] References Cited

U.S. PATENT DOCUMENTS

| | | | |
|---|---|---|---|
| 2,617,913 | 11/1952 | Oestreicher | 219/132 |
| 2,951,972 | 9/1960 | Pomazal | 219/130.5 |
| 3,253,118 | 5/1966 | Frederick | 219/130.5 |
| 3,581,051 | 5/1971 | Brown | 219/130.5 |
| 3,689,734 | 9/1972 | Burley et al. | 219/130.5 |
| 3,781,640 | 12/1973 | Toth | 219/130.5 |
| 4,109,130 | 8/1978 | Oku | 219/130.21 |

FOREIGN PATENT DOCUMENTS 2740529 3/1978 Fed. Rep. of Germany .

*Primary Examiner*—C. C. Shaw
*Attorney, Agent, or Firm*—Cushman, Darby & Cushman

[57] ABSTRACT

DC inert-gas welding apparatus with variable welding current has an automatic controller for reducing the welding current during the various stages of the welding process. The decrease in current is controlled by a single contact of a stepping circuit. A limit switch responsive to the output voltage of the welding apparatus controls the stepping circuit. The circuitry includes a variable search current adjusting resistor and a variable crater filling current adjusting resistor: these resistors are mutually independently variable, and the latter is connected to the tap of a potentiometer for adjusting the welding current. A variable ratio voltage divider connects the stepping circuit via a storage capacitor to the current setting circuit.

8 Claims, 2 Drawing Figures

WELDING APPARATUS WITH STEPPING CIRCUIT CURRENT CONTROL

BACKGROUND OF THE INVENTION:

1. Field of the Invention

The invention concerns welding apparatus, particularly for inert-gas DC welding, with an adjustable operating current, which for the purpose of avoiding end craters at welded connections has an automatic controller for continuously decreasing the current from the operating value—for instance, along an exponentially falling curve with adjustable time constants—and for automatic reduction from this intermediate current value to a minimum, preferably to zero, wherein these reductions can be initiated by a stepping circuit actuated preferably by one single control contact. Such apparatus has been described and claimed in DE-OS No. P2740529.4(=British Patent Application No. 39379/77), hereafter referred to as "the earlier invention".

2. Description of the Prior Art

In such types of welding apparatus, an increase or decrease of the operating current, hereafter designated "the welding current", is effected by pressing or releasing a switch on the welding torch. The control steps or stages, which are characterised mainly by the magnitude of the current, are controlled by a stepping circuit or switch serving automatically to effect stepping from one control state to the next. According to the respective switch-off times of the whole welding apparatus, the contacts of the current impulse switch of the stepping circuit are either closed or open. According to the position of the current impulse switch, when the supply voltage is switched on again the stepping circuit is in a stationary position before the first actuation of the torch switch or a control stage of the welding process. Consequently after the supply voltage is re-established the welding electrode passes voltage to the workpiece to be welded. On the first actuation of the torch switch the stepping circuit is accordingly either in its first control stage wherein arc striking and locating (seeking) takes place, or in the third control stage (reduced current strength) of releasing and holding. On releasing the torch switch the stepping circuit then automatically steps to the second control stage (welding) or to the fourth control stage (reduction or drop-out). For an operator working remotely from the apparatus it is not or barely possible to discern on actuation of the torch switch which control stage the welding apparatus is actually in.

Further, in the welding apparatus according to the earlier invention the adjustment of the magnitude of the crater filling current takes place independently of the magnitude of the welding current. Accordingly, each time the welding current is changed the crater filling current must also be re-adjusted so that welding is always effected with a constant ratio of crater filling current to welding current. The magnitude of the welding current corresponds to the magnitude of the crater filling current in the first control stage (striking and seeking). In the first control stage it is not possible to adjust the welding current independently of the crater filling current.

In the welding apparatus according to the earlier invention the transition from the control stage of welding to the control stage of releasing and holding as well as from the last-mentioned control stage to the control stage of drop-out is always regulated to a presettable constant intermediate current value along an exponentially falling curve with adjustable time constants. It is not possible so to exercise control as to perform the transition from one control stage to the next by a more or less sudden jump of predetermined magnitude.

SUMMARY OF THE PRESENT INVENTION

The invention provides welding apparatus which, similarly to the earlier invention, prevents the formation of craters and is further improved and developed relative to the earlier invention.

This is achieved according to the invention with a welding apparatus of the above-mentioned kind in that the stepping circuit is controllable by a limit switch controlled in dependence on the output voltage of the welding apparatus.

In this way, it is achieved that on each new switching-on of the welding apparatus by actuation of the torch switch, the welding electrode is of necessity dead i.e. voltage-free. The transition from the first control stage of striking and seeking with a low welding current strength to the second control stage with higher welding current can only take place when there is an actual flow of welding current. If this is not the case, then the output voltage of the welding apparatus rises and inhibits the stepping circuit via the limit switch. After the switch has been released the stepping circuit falls back to its rest (normal) position.

In a preferred embodiment of the invention, a Zener diode, connected in series with a relay, serves as the limit switch. This limit switch responds to a predetermined threshold value which may optionally vary from case to case. However, it is particularly advantageous if the limit switch responds to a threshold that is between the open circuit voltage and the arc voltage.

In order that the stepping should be rapidly locked-on, as by pulling-up the relay, i.e. on an interruption of the arc, it is advantageous if a storage or reservoir capacitor connected in the stepping circuit is rapidly dischargeable via a normally open contact of the relay.

In a preferred embodiment of the invention the storage or reservoir capacitor is shunted by the open contact when the threshold value is exceeded, so that a rapid inhibition of the stepping circuit, e.g. as the arc voltage is exceeded, is achieved.

A further improvement concerns the problem of being able to adjust the so-called search current, i.e. the welding current after arc strike, in the first control stage, independently of the crater filling current.

This is achieved according to the invention in a welding apparatus of the above-mentioned type in that a variable search current resistor is adjustable independently of a variable crater filling current resistor.

In order to ensure that the ratio of the crater filling current to welding current should not change independently of the value of the welding current adjuster when the setting of the crater filling current adjuster is to remain unaltered, it is advantageous according to the invention in a welding apparatus of the above-mentioned type, particularly however in the case where there is provided a variable search current resistor that is adjustable independently of a variable crater filling current resistor, to connect the crater filling current adjusting resistor to the tap of a welding current adjusting resistor.

Advantageously, the variable crater filling current resistor has a scale calibrated in fractions of the operating current, in order to enable the setting of crater filling current to be carried out as simply and as rapidly as possible.

Advantageously, also in a welding apparatus of the above-mentioned kind, when the torch switch is open and thus the relay has dropped out, a further relay containing a main power supply protector is connected in the circuit, together with a high-frequency supply for stabilising the arc.

A further development of the welding apparatus according to the earlier invention consists optionally in being able to carry out the transition from the control step of the welding to the control step of releasing and holding in a jump-like or sudden fashuon, as well as the transition from the control step of releasing and holding to the control step of drop-out or vice versa. However, it is particularly advantageous to set a lower voltage divider ratio in the transition from the control step of the welding to the control step of releasing and holding than in the transition from the control step of releasing and holding to the control step of drop-out. This is particularly favourable in the case where during the welding process a transition must frequently be made to "half-current". An especially simple change of the potentiometer ratio can be achieved by changing over or commuting the stepping circuit. Further characteristics and advantages of the invention will become clear from the following detailed description of a preferred embodiment of the invention with reference to the drawings.

DESCRIPTION OF THE PREFERRED EMBODIMENTS

Figure 1:
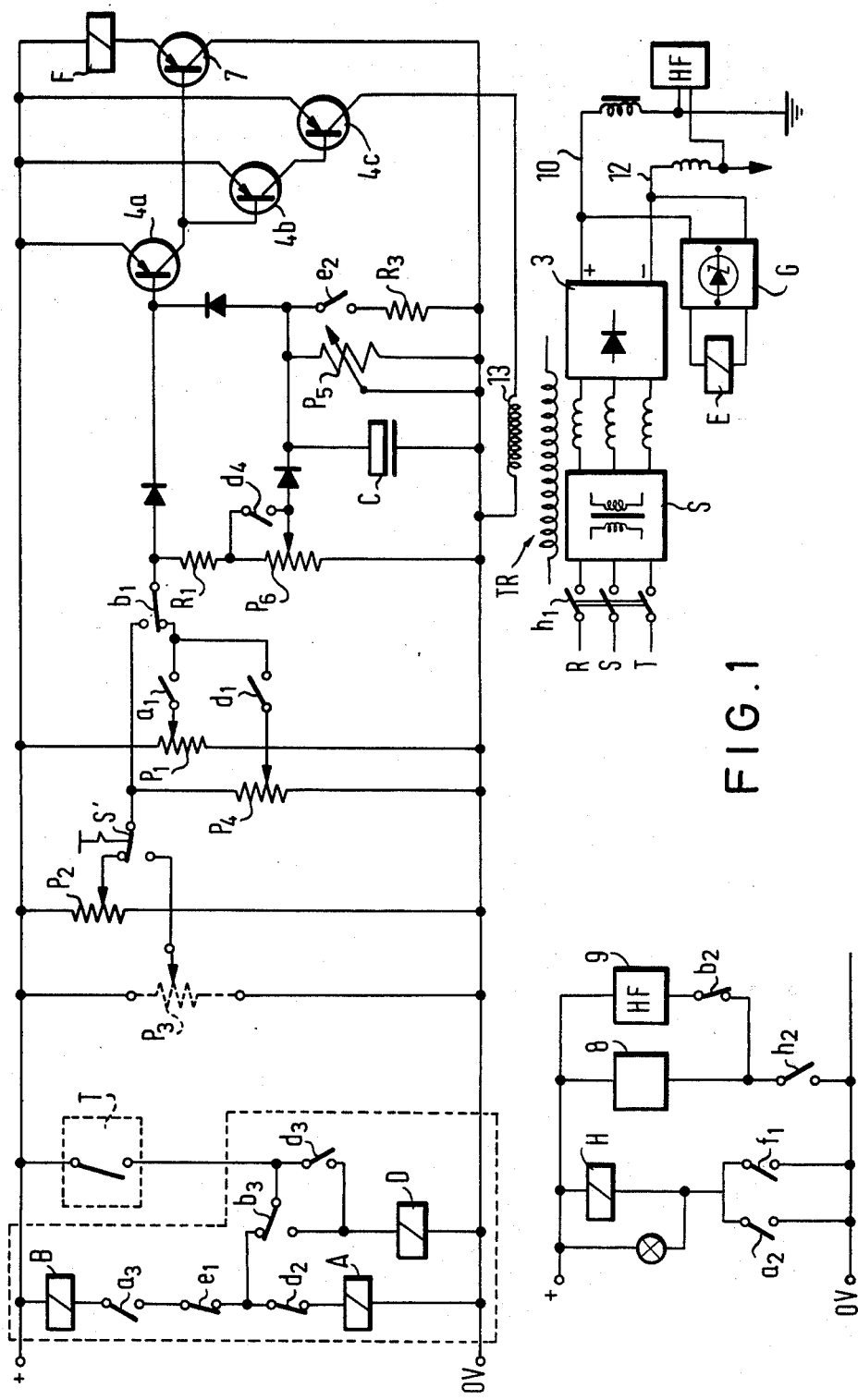
FIG. 1 is a circuit diagram of a preferred embodiment of the invention.

As can be seen from FIG. 1, the welding apparatus has a welding transformer S with a serially connected magnetic amplifier (transductor) TR and a rectifier 3, the output lines 10 and 12 of the latter being respectively connected with the workpiece and a welding electrode. The magnitude of the welding current is controlled by the DC magnetisation of the transductor TR. It will be appreciated that the invention is also applicable to welding apparatus according to the welding transformer system or to a thyristor-controlled welding device.

The transductor TR is controlled by a Darlington amplifier stage having transistors 4a, 4b, 4c, in which the base of transistor 4a is dead (open-circuited) in the normal position, whereby such transistor and thus the Darlington amplifier stage is inhibited and no transistor current flows.

A limit switch G is connected to the output lines 10 and 12 of the welding rectifier and thereby controls the relay E. Preferably, the limit switch G operates or trips the relay E when the voltage appearing on the output lines and 12 of the welding rectifier is greater than 50 volts, and the relay E drops out when the voltage is below 50 volts.

When a welding arc exists, the voltage at the welding rectifier output lines 10 and 12 is less than 45 volts while the voltage at the welding rectifier output lines is at least 55 volts in the open-circuit position (raised electrode and interrupted arc).

The invention further includes a plurality of additional relays A, B, D, F and H; the contacts of these relays being respectively designated with lower case letters a, b, d, f, and h. The contacts of relay E are designated $e_1$ and $e_2$. It will be noted that in the drawing all the relays A to H are shown in their current-free, i.e. dropped-out, state.

One end of the control coil of the transductor TR is connected to the collector of the Darlington amplifier output 4C while its other end is grounded. One end of the relay F is connected to the positive supply while its other end is connected via the emitter-collector path of a transistor 7 to ground, the transistor 7 being controlled by contacts $b_1$, $a_1$ and $d_1$ of the stepping control.

A variable resistor $P_2$, for setting the operating current is connected between the positive supply and ground and its tap is connected to the high voltage end of a variable resistor $P_4$, for setting the crater filling current. The other end of the resistor $P_4$ is grounded. Further, a variable search current resistor $P_1$ is connected between the positive supply and ground. Optionally, there may also be provided a remotely adjustable operating current resistor $P_3$ between the positive supply and ground. Resistor $P_3$ may be actuated with a switch $S^1$ instead of the variable resistor $P_1$. The transductor control circuit of the Darlington amplifier and the control coil 13 is connected to one of the variable resistors $P_1,P_2,P_4$ by a respective contact $b_1$, $a_1$, $d_1$. The storage capacitor C is charged over the voltage divider $R_1$, $P_6$. Capacitor C delivers the control voltage, optionally with decreasing magnitudes, for the Darlington circuit. The discharge period depends primarily on the setting of the variable resistor $P_5$. When the contact $e_2$ is closed under the control of the stepping circuit the discharge period is determined by the resistor $R_3$, which has a relatively small resistance.

The main power supply protector H actuates the welding transformer over the contacts $h_1$. The auxiliary contact $h_2$ actuates a gas valve 8 and a high frequency generator 9.

The mode of operation of the welding apparatus according to the invention is explained with the aid of the Table given below. In the Table, the excitation or pulling-up of a relay in the individual control stages is indicated by an "x".

| Position of the torch switch | | Control Stages | Relay or Protector | | | | | | | | |
|---|---|---|---|---|---|---|---|---|---|---|---|
| | | | A | B | D | E | F | H | L | GAS | HF |
| o—o | (A) | Start + striking | x | | | x | x | x | x | x | x |
| | | Seeking | x | | | | x | x | x | x | x |
| TIG** o⟋o | (B) | Welding | x | x | | | x | x | x | x | |

-continued

| Position of the torch switch | | Control Stages | | A | B | D | E | F | H | L | GAS | HF |
|---|---|---|---|---|---|---|---|---|---|---|---|---|
| o—o | Ⓒ | Crater-filling | Releasing + holding | | x | | x | x | x | x | | x |
| o⁄o | Ⓓ | | Drop out | | | | x | x | x | | x | x |
| o⁄o | | | Off | | | | | | x | | 1* | |
| E** | | | | x | | | | x | | | | |

1* Post-arc flow
**Tungsten-inert gas process
***Electro-welding

According to the invention the stepping control primarily comprises the switch T built into the torch or rod-holder and the relays A, B and D. It will be appreciated that instead of expensive relays, it is also possible to use a trigger circuit employing trigger diodes. However, such circuit elements are often susceptible to undesired overrun or stage-skipping in the stepping circuit due to the high current impulses arising in arc welding, with attendant strong interference (stray) fields. Consequently in the final analysis it is advantageous in the practice of the invention to employ relays in the stepping control.

In the initial position all three relays are current-free. At the beginning of control stage Ⓐ upon actuation of the switch T, the relay A is energized over contacts $b_3, d_2$ and the main power supply protector H is energized over contact $a_2$. Further, upon actuation of switch T, the relay F is excited since the contact $a_1$ of the variable resistor $P_1$ is at the supply voltage and the DC coil 13 of the transductor TR is energised over Darlington amplifier. An open circuit voltage of more than 50 volts is present between the electrode and the workpiece. Consequently the relay E is actuated to open contact $e_1$ thereof and close contact $e_2$ thereof. These two switching procedures do not, however, have any significance at this stage. When a welder now strikes an arc, the voltage at the output of the rectifier 3 drops to below 50 volts and the relay E drops out. The contact $e_1$ re-closes and the contact $e_2$ opens. If the switch T is now released, its contact opens and as a result, the relay B is energized. The relay A remains operative. Thus control stage Ⓑ is initiated. The contact $b_1$ connects the control device of the transductor TR to the variable working current adjusting resistor $P_2$. The current at the Darlington amplifier rises and a higher welding current flows. If the switch T is reactuated, its contact closes and the relay D is activated over the changed-over contact $b_3$. This is effective to close the contact $d_3$ and to lock-in relay D, independently of the position of the contact $b_3$. As a result of the simultaneous opening of the contact $d_2$ the relays A and B drop out. The contact $d_1$ connects the control of the transductor TR to the variable crater filling current adjusting resistor $P_4$. Nothing changes at the relays F and E. As the storage capacitor C was charged to a relatively high voltage in control stage Ⓑ, the voltage of the storage capacitor C is now higher than the voltage at the tap of the variable resistor $P_4$. Hence the current in the transductor TR, and thus the welding current, cannot immediately drop to the new value. The transition ensues gradually according to an exponential function. It is here emphasized that the contact $d_4$ is not here included, and consequently will be subsequently described. If the switch T is now released the relay D also drops out while the relays A and B remain inoperative and nothing changes at the relays F and E. Consequently the circuit protector H remains energized over the contact $f_1$. The high frequency generator 9 and the gas valve 8 remain switched on and open, respectively, over the contact $h_2$. The control device for the transductor current, and thus for the welding current, is now disconnected from all the potentiometers. Only the storage capacitor C is operative. The current decay takes place in dependance upon the setting of the variable resistor $P_5$. When the voltage at the storage capacitor C becomes so low that the transistor 7 no longer conducts, the relay F falls out opening contact f, whereby the main power supply protector H is open-circuited, and drops out and deactivates the welding transformer, and thus also cuts off the welding current.

If in control stage or step Ⓐ the welding operator did not strike an arc or if during the subsequent control steps Ⓑ to Ⓓ the arc was extinguished, the voltage at the output of the rectifier 3 would have risen to over 50 volts and the relay E would have been energized. In this case, at least the relay B in the step control circuit would have been open-circuited over the contact $e_1$ and thus the control stage Ⓐ would automatically have been set. The storage capacitor C would have been rapidly discharged via the contact $e_2$ and resistor $R_3$. When the switch T is not actuated, the normal initial position appears; when the switch T is actuated, the sequential control step A arises. It is to be noted that switch $S^1$ in the line from the tap of the variable resistor $P_2$ is a change-over switch, by means of which the "remotely" adjustable resistor $P_3$ may be substituted for the resistor $P_2$.

In an advantageous development of the welding apparatus according to the invention, the welding current control is complemented by contact $d_4$ of the relay D, by means of which the voltage ratio of the voltage divider $R_1$-$P_6$ becomes variable, whereby the magnitude of voltage charging applied to the storage capacitor C as determined by the voltage divider $R_1$-$P_6$ can be varied by adjustment of the variable resistor $P_6$. Diodes are provided to prevent the storage capacitor C from being charged to the base voltage of the Darlington transistor $4_a$. The variable resistor $P_6$ allows both the magnitude of the jump in the transition from control stage Ⓑ to control stage Ⓒ as well as in the transition from control stage Ⓒ to control stage Ⓓ to be preselected. The voltage divider ratio is variable over the contact $d_4$. The advantage from this arrangement that for the transition from control stage Ⓑ to control stage Ⓒ a different, usually lower, voltage ratio is set than for the transition from control stage Ⓒ to control stage Ⓓ. This is advantageous because during the welding process one must often go over to "half-current". This process is described in detail in said earlier invention.

If a special, separate setting of the search current is dispensed with, then the contact $d_1$ is simply connected in parallel with the contact $a_1$. In this case the search current corresponds to the crater filling current.

The control circuit of the Darlington amplifier is so designed that the control current in the control coil 13 of the transductor TR is linearly controllable within predetermined limits. For the sake of clarity, the specially dimensioned linearizing resistors required for this purpose are not shown in the circuit diagram.

FIG. 1 shows the course of the current over the four control stages of a welding process. Reference is made to the detailed description in said earlier invention.

Figure 2:
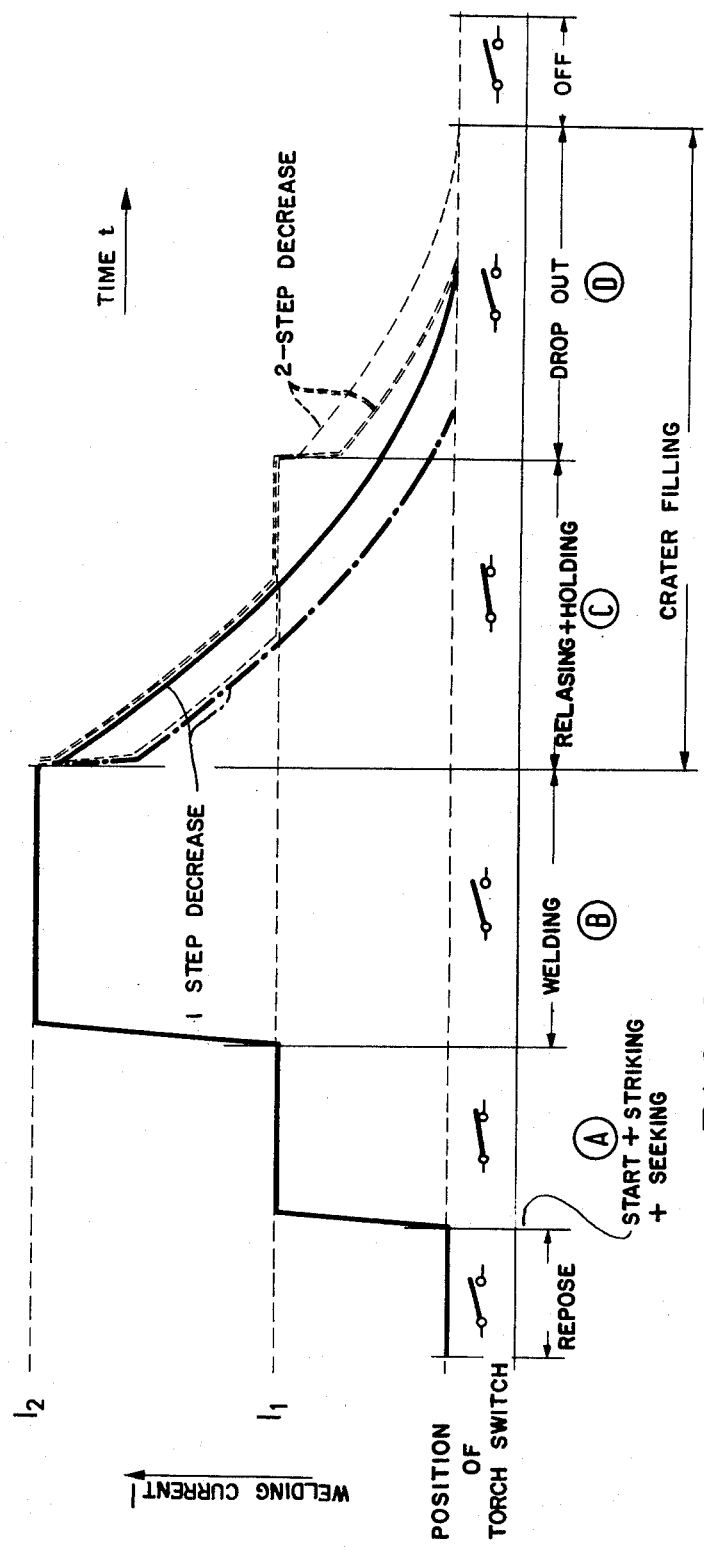
FIG. 2 shows the behaviour of the current during a welding process with four control steps.

As can be seen from FIG. 2, the transitions from control stage B to control stage C in the one step drop-out or decrease or from control stage C to control stage D in the two step drop-out or decrease, have different jump heights which are preselectably settable in each case by a corresponding setting of the potentiometer $P_5$. Hence it is possible e.g. in the one step drop-out to decrease the welding current either gradually from the start (full line) or initially in a discontinuous jump and then gradually (broken line) in accordance with an exponential function.

By virtue of the provision of a voltage divider $R_1$-$P_6$, adjustable by a current adjuster and connectable to a storage capacitor C, in the two step decrease the transitions from control stage Ⓑ to control stage Ⓒ as well as from control stage Ⓒ to control stage Ⓓ may selectably be set to different jump heights so that in one case the current behaviour illustrated by the single broken line can be selected while in another case, the current behaviour illustrated by the double broken lines can be selected. In general, the current behaviour illustrated in single broken line is preferred.

I claim as my invention:

1. An electric welding apparatus, particularly for inert gas d.c. welding, having an operation circuit, including a power supply and the welding electrode, and a control circuit for controlling the operation circuit, said control circuit including a stepping circuit comprising:

first switching circuit means for setting a repose current, second switching circuit means for setting an ignition current and switching on the power supply for the operation circuit, third switching circuit means for setting a welding current, fourth switching circuit means for reducing, with an adjustable time constant, the welding current to an intermediate crater filling current value, and fifth switching circuit means for reducing, with an adjustable time constant, said intermediate crater filling current value to said repose current, said first to fifth switching circuit means being operatively connected to and controlled by the successive operation of a trip switch and a limit switch, said limit switch being energized when the output voltage of the welding apparatus rises to a value above the welding voltage so that when said limit switch is energized said stepping circuit is automatically reset to one of said first or second switching circuit means as a function of the switching state of said trip switch.

2. An electric welding apparatus as in claim 1, wherein the limit switch includes a Zener diode connected in series with a relay which resets said stepping circuit.

3. An electric welding apparatus as in claim 1, wherein said limit switch is arranged to respond to a predetermined threshold value which is between the open circuit voltage and the arc voltage of the operation circuit.

4. An electric welding apparatus as in claim 1, wherein said fourth and fifth switching circuit means include an RC network having a storage capacitor that is rapidly dischargeable by a normally open switch closed when said limit switch is energized.

5. An electric welding apparatus, particularly for inert gas d.c. welding, having an operation circuit, including a power supply and the welding electrode, and a control circuit for controlling the operation circuit, said control circuit including a stepping circuit, comprising:

a first switching circuit for setting a repose current, a second switching circuit for setting an ignition current and switching on the power supply for the operation circuit, a third switching circuit for setting a welding current, a fourth switching circuit for reducing, with an adjustable time constant, the welding current to an intermediate crater filling current value, a fifth switching circuit for reducing, with an adjustable time constant, said intermediate crater filling current value to said repose current, said first to fifth switching circuits being controlled by the successive operation of a trip switch, said third switching circuit including a first variable resistor for setting a welding control voltage determining the welding current, said fourth switching circuit including a second variable resistor for setting an intermediate control voltage determining said intermediate crater filling current, said control circuit further including RC circuit means, comprised of a capacitor for determining the control current and time constants for said fourth and fifth switching circuits, and a variable voltage divider for determining the charge voltage of said capacitor, said voltage divider being successively connected to said first resistor of said third switching circuit to charge the capacitor to a first charge voltage below said welding control voltage, and to said second resistor of said fourth switching circuit to limit the discharge of the capacitor to a second charge voltage below said intermediate control voltage, whereby the operation current drops from the welding current to an initial current according to said first charge voltage of the capacitor when switching the control circuit from said third switching circuit to said fourth switching circuit followed by a gradual exponential drop to a predetermined intermediate current value, and drops from said intermediate current value to a second intermediate value greater than said repose current followed by a gradual exponential drop to said repose current according to said second charge voltage of the capacitor when switching the control circuit from said fourth switching circuit to said fifth switching circuit.

6. An electric welding apparatus as in claim 5, wherein said resistor is connected to said first variable resistor.

7. An electric welding apparatus as in claim 5 or 6 wherein said second variable resistor has a scale calibrated in fractions of the welding current.

8. An electric welding apparatus as in claim 5, wherein the voltage divider ratio of said voltage divider is varied by switching the control circuit from said third switching circuit to said fourth switching circuit.

* * * * *